United States Patent
McBrearty et al.

(10) Patent No.: US 9,465,876 B2
(45) Date of Patent: Oct. 11, 2016

(54) MANAGING CONTENT AVAILABLE FOR CONTENT PREDICTION

(71) Applicant: INTERNATIONAL BUSINESS MACHINES CORPORATION, Armonk, NY (US)

(72) Inventors: Gerald F. McBrearty, Austin, TX (US); Shawn P. Mullen, Buda, TX (US); Jessica C. Murillo, Round Rock, TX (US); Johnny M. Shieh, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 348 days.

(21) Appl. No.: 14/021,102

(22) Filed: Sep. 9, 2013

(65) Prior Publication Data

US 2015/0074125 A1    Mar. 12, 2015

(51) Int. Cl.
H04L 12/58 (2006.01)
G06F 17/30 (2006.01)
G06F 3/023 (2006.01)

(52) U.S. Cl.
CPC ....... G06F 17/30867 (2013.01); G06F 3/0237 (2013.01)

(58) Field of Classification Search
CPC ............. G06F 17/2881; G06F 3/0237; G06F 17/30867
See application file for complete search history.

(56) References Cited

U.S. PATENT DOCUMENTS

| 7,797,269 | B2 | 9/2010 | Rieman et al. | |
| 8,180,630 | B2 | 5/2012 | Goud et al. | |
| 2005/0027779 | A1* | 2/2005 | Schinner | G06Q 10/107 709/200 |
| 2005/0210115 | A1* | 9/2005 | Naito | G06F 17/2881 709/206 |
| 2006/0213968 | A1* | 9/2006 | Guest | G06Q 20/10 235/375 |
| 2008/0147812 | A1* | 6/2008 | Curtis | G06Q 10/10 709/206 |
| 2010/0161733 | A1 | 6/2010 | Bower et al. | |
| 2011/0078260 | A1* | 3/2011 | Rashad | G06Q 10/107 709/206 |
| 2011/0087744 | A1* | 4/2011 | Deluca | G06Q 10/107 709/206 |
| 2011/0208816 | A1* | 8/2011 | Chavez | G06Q 10/107 709/206 |
| 2012/0089925 | A1 | 4/2012 | Perry et al. | |
| 2014/0289258 | A1* | 9/2014 | Joshi | G06Q 10/107 707/741 |
| 2015/0195225 | A1* | 7/2015 | Albert | H04L 67/2828 709/206 |

OTHER PUBLICATIONS

Asch, Josh, "iOS5: How to add words to the auto-correct dictionary", dated Oct. 14, 2011, accessed online from http://gigaom.com/2011/10/14/ios-5-how-to-add-words-to-the-auto-correct-dictionary/ as of Sep. 9, 2013, 9 pages.

* cited by examiner

*Primary Examiner* — Tarek Chbouki
(74) *Attorney, Agent, or Firm* — Amy J. Pattillo; Steven L. Bennett

(57) ABSTRACT

A computer identifies at least one common content element used by each of at least two users from at least one communication by each of the at least two users. Responsive to one of the at least two users constructing content for a potential communication to the other of the at least two users, the computer accesses the at least one common content element for use by at least one content prediction service enabled for presenting one or more possible content elements comprising the at least one common content element for user selection during construction of the content for the potential communication.

13 Claims, 8 Drawing Sheets

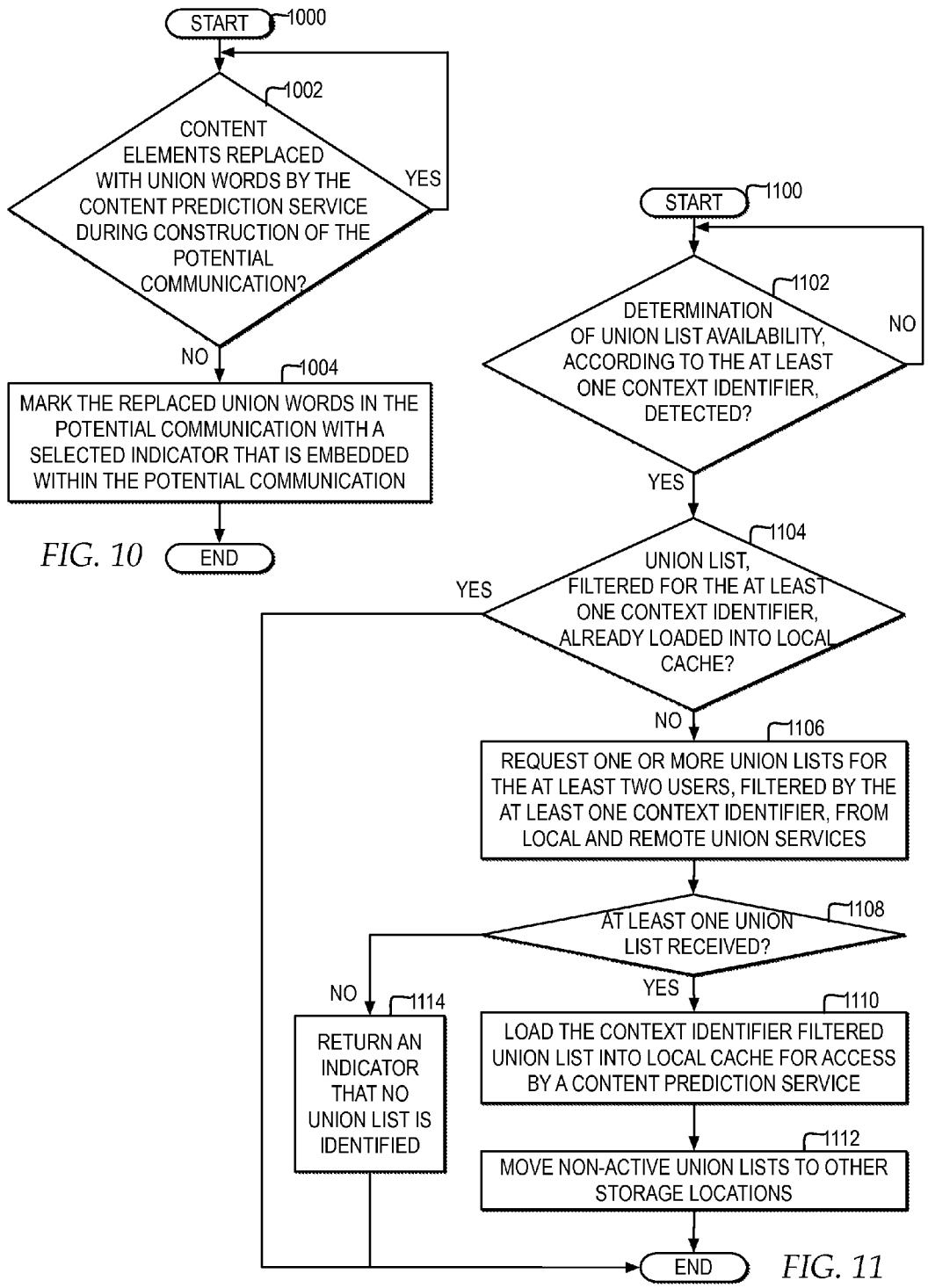

MANAGING CONTENT AVAILABLE FOR CONTENT PREDICTION

BACKGROUND

1. Technical Field

This invention relates in general to computing systems and more particularly to managing content available for content prediction.

2. Description of the Related Art

A common feature of electronic mail applications, word processing programs, chat programs, and texting programs is a content prediction feature, such as an autocorrect feature or spell check function, where as a user composes content within the program, the content prediction feature predicts content that a user may intend to compose and displays the predicted content for a user to select, to replace a word, portion of a word, or phase within the composed content with the predicted content. When a user is composing content using a small keyboard or touch screen, such as a mobile keyboard or touchscreen, the user may rely on the content prediction feature to predict the complete word that a user intends to compose, based on only a few letters of the word, so that the user can select the predicted content to complete the word, allowing the user to increase the speed at which the user can compose the communication or to quickly correct misspelled words as the user composes content.

BRIEF SUMMARY

In view of the foregoing, there is a need for a method, system, and computer program product for customizing the predicted content for content prediction functions by learning from the content composed by a user and by learning from the content composed by others sending communications to a user. In addition, there is a need for a method, system, and computer program product for customizing the predicted content for content prediction functions by further identifying which content is commonly used by both a user sending communications and the other users from whom the user receives communications and building a list of at least one common content element used by each of the sender and the recipient.

In one embodiment, a method for managing content available for content prediction is directed to storing, by a computer, one or more first content elements parsed from one or more first communications sent by a first user to one or more other users. The method is directed to storing, by a computer, one or more second content elements parsed from one or more second communications received by the first user from a second user of the one or more other users. The method is directed to identifying, by the computer, a union list comprising at least one common content element stored in both the one or more first content elements and the one or more second content elements by storing, by the computer, one or more first context elements identified from the one or more first communications with the one or more first content elements and storing, by the computer, one or more second context elements identified from the one or more second communications with the one or more second content elements. The method is directed, responsive to the first user constructing content for a potential communication to at least the second user, to accessing, by the computer, the union list comprising the at least one common content element for use by at least one content prediction service enabled to present one or more possible content elements comprising the at least one common content element for user selection during construction of the content for the potential communication. The method is directed to filtering, by the computer, the one or more first context elements and the one or more second context elements in the at least one union list, according to at least one context identifier identified for the potential communication. The method is directed, responsive to the at least one context identifier identified for the potential communication changing to a second context identifier, to filtering, by the computer, the one or more first context elements and the one or more second context elements in the at least one union list according to the second context identifier In another embodiment, a system for managing content available for content prediction comprises a computer operative to identify at least one common content element used by each of at least two users from at least one communication by each of the at least two users. The system comprises the computer, responsive to one of the at least two users constructing content for a potential communication to the other of the at least two users, operative to access the at least one common content element for use by at least one content prediction service enabled for presenting one or more possible content elements comprising the at least one common content element for user selection during construction of the content for the potential communication.

In another embodiment, a system for managing content available for content prediction comprises a computer, comprising at least one processor, configured to store one or more first content elements parsed from one or more first communications sent by a first user to one or more other users. The system comprises the computer configured to store one or more second content elements parsed from one or more second communications received by the first user from a second user of the one or more other users. The system comprises the computer configured to identify a union list comprising at least one common content element stored in both the one or more first content elements and the one or more second content elements by storing, by the computer, one or more first context elements identified from the one or more first communications with the one or more first content elements and storing, by the computer, one or more second context elements identified from the one or more second communications with the one or more second content elements. The system comprises the computer, responsive to the first user constructing content for a potential communication to at least the second user, configured to access the union list comprising the at least one common content element for use by at least one content prediction service enabled for presenting one or more possible content elements comprising the at least one common content element for user selection during construction of the content for the potential communication. The system comprises the computer configured to filter the one or more first context elements and the one or more second context elements in the at least one union list, according to at least one context identifier identified for the potential communication. The system comprises the computer, responsive to the at least one context identifier identified for the potential communication changing to a second context identifier, configured to filter the one or more first context elements and the one or more second context elements in the at least one union list according to the second context identifier.

In another embodiment, a computer program product for managing content available for content prediction comprises one or more computer-readable tangible storage devices. The computer program product comprises program instructions, stored on at least one of the one or more storage devices, to store one or more first content elements parsed from one or more first communications sent by a first user to one or more other users. The computer program product comprises program instructions, stored on at least one of the one or more storage devices, to store one or more second content elements parsed from one or more second communications received by the first user from a second user of the one or more other users. The computer program product comprises program instructions, stored on at least one of the one or more storage devices, to identify a union list comprising at least one common content element stored in both the one or more first content elements and the one or more second content elements by storing one or more first context elements identified from the one or more first communications with the one or more first content elements and storing one or more second context elements identified from the one or more second communications with the one or more second content elements. The computer program product comprises program instructions, stored on at least one of the one or more storage devices, responsive to the first user constructing content for a potential communication to at least the second user, to access the union list comprising the at least one common content element for use by at least one content prediction service enabled for presenting one or more possible content elements comprising the at least one common content element for user selection during construction of the content for the potential communication. The computer program product comprises program instructions, stored on at least one of the one or more storage devices, to filter the one or more first context elements and the one or more second context elements in the at least one union list, according to at least one context identifier identified for the potential communication. The computer program product comprises program instructions, stored on at least one of the one or more storage devices, responsive to the at least one context identifier identified for the potential communication changing to a second context identifier, to filter the one or more first context elements and the one or more second context elements in the at least one union list according to the second context identifier

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 10 is a high level logic flowchart depicting one example of a high level logic flowchart of a process and program for marking union words in a proposed communication; and FIG. 11 is a high level logic flowchart depicting one example of a high level logic flowchart of a process and program for moving context identifier filtered union lists into local cache for use by a content prediction service.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

As described herein, embodiments of the invention provide a solution for identifying at least one common content element used by each of at least two users from at least one communication by each of the at least two users, where the common content element represents a union element. Responsive to one of the at least two users constructing content for a potential communication to the other of the at least two users, the invention provides a solution for accessing at least one common content element by at least one content prediction service enabled for presenting one or more possible content elements comprising the at least one common content element for user selection to replace one or more content elements during construction of the content for the potential communication.

Figure 1:
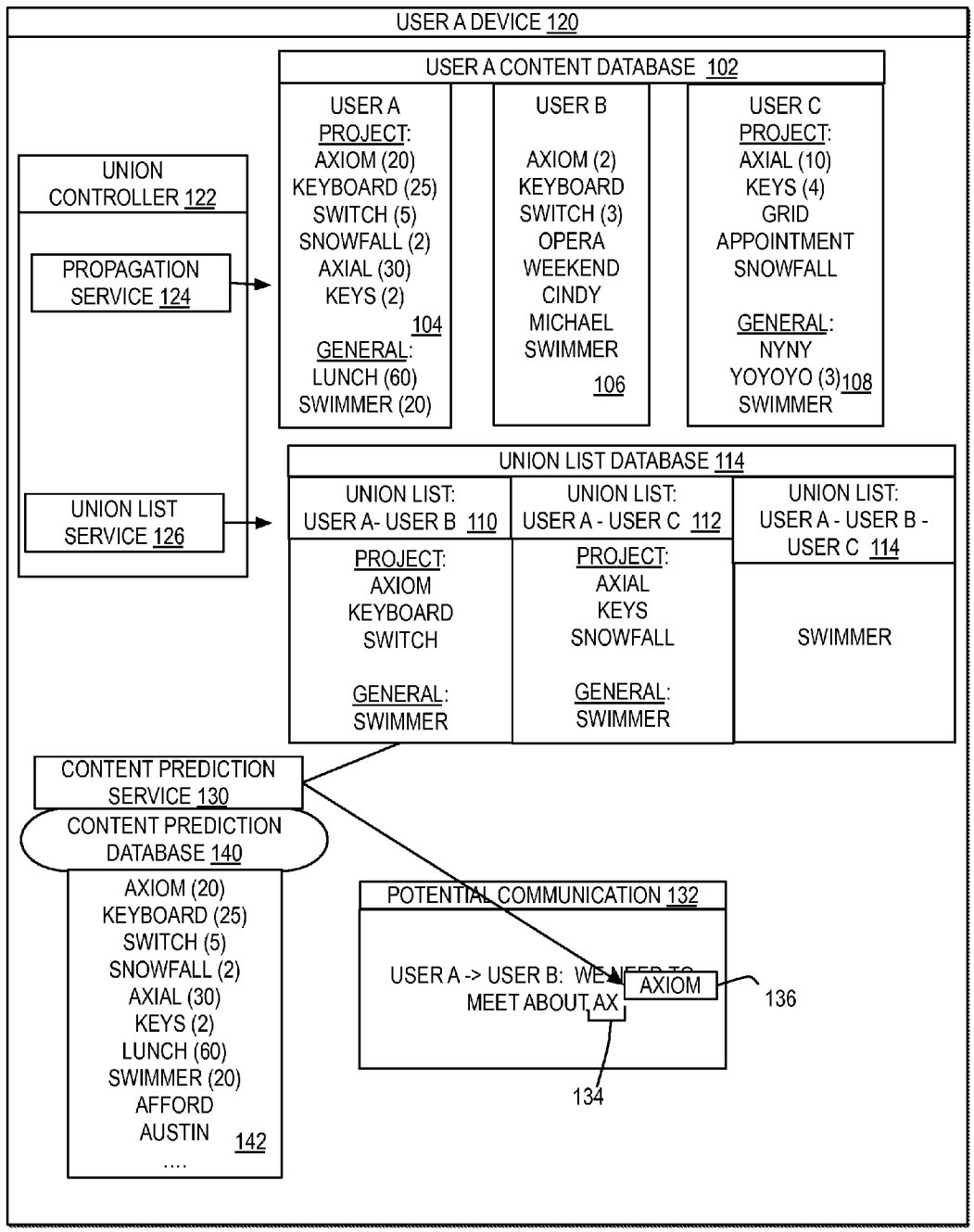
FIG. 1 is a block diagram illustrating one example of a content database arranged by user of the content and a separate union list specifying at least one common content element used by a particular user and at least one other user identified from the content database.

With reference now to the figures, and in particular with reference now to FIG. 1, a block diagram illustrates one example of a content database arranged by user of the content and a separate union list specifying at least one common content element used by a particular user and at least one other user identified from the content database.

In the example, a user A device 120 accesses a user A content database 102. In the example, user A content database 102 includes a record 104 for user A, a record 106 for user B, and a record 108 for user C. In the example, user A content database 102 is specified with user A as the sender or owner of the database and user B and user C as other users included as contacts of user A. In the example, user A content database 102 may be a stand-alone database or may be integrated into another contact database supported by an operating system, application or service. In additional or alternate examples, the data stored in user A content database 102 may be stored in one or more additional or alternate configurations.

In one example, user A device 120 access one or more services or controllers, at one or more layers, including but not limited to, an operating system layer, an application layer, and a remote services layer. In one example, user A device 120 access a union controller 122 that includes a propagation service 124 for propagating content elements into records in user A content database 102 and a union list service 126 for detecting any common content elements used by both user A and at least one other user from user A content database 102 and generating union lists of at least one common content elements used by both user A and at least one other user.

In one example, content elements may include, but are not limited to, words, phrases, sounds and other audio, video, emoticons, graphical elements, video, tactile outputs, and other detectable content. Propagation service 124 may include controllers specified for detecting and parsing different types of content elements from communications.

In one example, the content elements propagated into record 104 by propagation service 124 may include content elements specified by user A from one or more sources generated by user A. For example, record 104 may include content elements parsed by propagation service 124 from one or more communications sent by user A. For example, record 104 may include content elements parsed by propagation service 124 from one or more documents generated or commented upon by user A and attached to one or more communications sent by user A. For example, record 104 may include content elements entered by user A through an interface and stored in record 104.

In one example, the content elements recorded in record 106 and record 108 represent content elements parsed by propagation service 124 from one or more sources received by user A separately from each of user B and user C. For example, record 106 may include content elements parsed by propagation service 124 from one or more communications received by user A from user B and record 108 may include content elements parsed from one or more communications received by user A from user C. For example, record 106 may include content elements parsed by propagation service 124 from a document or other file attached to a communication received by user A from user B. For example, record 106 may include content elements entered by user A into an interface and stored in record 106 and record 108 may include content elements entered by user A into an interface and stored in record 108.

In the example, in addition to propagation service 124 storing content elements within one or more records in user A content database 102, propagation service 124 may parse or detect context associated with one or more content elements and store context elements with content elements in one or more records in user A content database 102. In one example, propagation service 124 may detect subject matter context identifying whether content is parsed from communications related to a "project" or whether the content is parsed from communications on "general" topics. In the example, record 104 and record 108 separately identifies content elements parsed with a subject matter context of "project" as distinguished from content elements parsed with a subject matter context of "general". In other examples, propagation service 124 may detect and store other types of context.

In addition, in the example, in addition to propagation service 124 storing content elements within one or more records in user A content database 102, propagation service 124 may detect and store a frequency with which content elements are used by each user in user A content database 102. In one example the frequency with which a content element is used may be tracked by updating a counter with each content element in a record each time propagation service 124 detects the content element. For example, as illustrated in record 104, propagation service 124 has counted user A use "AXIOM" 20 times, "KEYBOARD" 25 times, "SWITCH" 5 times, "SNOWFALL" 2 times, "AXIAL" 30 times, "KEYS" 2 times, "LUNCH" 60 times, and "SWIMMER" 20 times. In the example illustrated in record 106, for communications sent by user B to user A, propagation service 124 has counted user B use "AXIOM" 2 times and "SWITCH" 3 times. In the example illustrated in record 108, for communications sent by user C to user A, propagation service 124 has counted user C use "AXIAL" 10 times, "KEYS" 4 times, and "YOYOYO" 3 times.

In the example, union list service 126 compares the content elements of record 104, for user A, with contents elements in each of the other records in user A content database 102, and generates one or more union lists, which may be stored or collected in a union list database 114. Each union list may include content elements, context elements, frequency elements, and other data available from user A content database 102 or other sources. In one example, to minimize overhead by union list service 126 and union list database 114, union list service 126 may monitor for updates by propagation service 124 to user A content database 102, compare only the updated data in user A content database 102 to identify any new common content elements or new users, and update union lists with new common content elements and context within one or more union lists of union list database 114.

In the example, union list service 126 compares the content elements of record 104, by context, with the content elements of record 106 and identifies a union list 110 specifying any common content elements used by both user A and user B. In the example, union list 110 includes the common content elements in both record 104 and record 106 under the subject matter context of "project" of "axiom", "keyboard", and "switch" and under the subject matter of "general" of "swimmer".

In the example, union list service 126 compares the content elements of record 104, by context, with the content elements of record 108 and identifies a union list 112 specifying any common content elements used by both user A and user C. In the example, union list 112 includes the common content elements in both record 104 and record 108, under the subject matter context of "project" of "axial", "keys", and "snowfall", and under the subject matter context of "general" of "swimmer".

In the example, union list service 126 may also compare the content elements of record 104, record 106, and record 108 and identify a union list 114 specifying the common content elements used by each of user A, user B, and user C. In the example, union list 114 includes the common content elements in each of record 104, record 106, and record 108, of "swimmer". In one example, union list service 126 may automatically generate union list 114 for more than two users, if union list service 126 detects that user A frequently communicates with both user B and user C, or union list service 126 may wait until user A begins to compose a potential communication to both user B and user C, before generating union lists for more than two users, such as union list 114.

In one example, union lists within union list database 114 may be distributed across one or more local storage devices of user A device 120, including one or more levels of cache, and may also be pushed to one or more remote storage locations, and retrieved from the remote storage locations by user A device 120 only when needed. In addition, by generating union lists that are further specified according to context, portions of one or more union lists may be pushed to external storage locations or pulled from external storage locations according to context. For example, union list service 126 may push all the portions of union list 110 and union list 112 that are identified under the subject matter context of "project" to an external storage device and only pull these portions of union list 110 and union list 112 back to user A device 120 when the subject matter context of future communications falls under the subject matter associated with "project". Union list service 126 may also control which portions of union list 110 and union list 112 are stored within primary cache, secondary cache, and other storage devices of user A device 120, according to user identifiers and one or more context elements.

In the example, user A device 120 may host or access a content prediction service 130 for analyzing content, as a user enters content elements or following entry of content elements through an interface, and making suggestions of other content to replace one or more content elements, whether by complete replacement, completion of a content element, cancellation of a content element, or adjusting for an omission between content elements. In one example, content prediction service 130 analyzes the content entered within an interface of user A device 120 that enables a user to compose a potential communication from the user to at least one other user. In another example, content prediction service 130 analyzes the content entered within an interface of user A device 120 that enables a user to comment on a document, such as by adding comments in a document, received from or originally composed by another user.

In one example, content prediction service 130, whether operating as a service of the operating system, an application, or accessed from an external service provider, may access a content prediction database 140, which stores a dictionary of content elements that may be used by content prediction service 130 as a source of replacement content elements when analyzing content entered by the user and making suggestions of replacement content. In one example, content prediction database 140 may include an initial dictionary of generic entries provided to all users of content prediction service 130. Content prediction service 130 may receive content updates for content prediction database 140 from one or more external systems. In addition, content prediction service 130 may also update and populate content prediction database 140 with content elements frequently entered by the user, as determined from record 104 or another content element tracking record. For example, a portion of the entries 142 from content prediction database 140, may include entries of "AXIOM," "KEYBOARD," "SWITCH," "AXIAL," "KEYS," "LUNCH,", and "SWIMMER from record 104, along with the frequency of use by user A tracked for each entry, and may include entries of "AFFORD" and "AUSTIN" from an initial dictionary of generic content elements.

In the example, content prediction service 130 may also access one or more entries in union list database 114 and update content prediction database 140 with the entries accessed from union list database 114 or apply the entries from union list database 114 without adding the entries to content prediction database 140. In one example, as user A prepares a potential communication 132 within an interface, from user A to user B, union list service 126 may detect potential communication 132 and automatically identify union list 110 for user A and user B and push union list 110 to content prediction service 130, identifying the common content elements for user A and user B, to content prediction service 130 to use in making suggestions to user A for possible words to replace one or more content elements during the construction of potential communication 132. In another example, as user A prepares potential communication 132, content prediction service 130 may request a union list for user A and user B, from union list service 126, and union list service 126 may generate and return union list 110 to content prediction service 130. In another example, union list service 126 maintains union list database 114, automatically updating union list database 114 as propagation service 124 updates user A content database 102, and in response to user A preparing potential communication 132 from user A to user B, content prediction service 130 may automatically search union list database 114 for union list 110 for user A and user B. In additional or alternate embodiments, union list service 126, union list database 114, content prediction service 130, and content prediction database 140 may be implemented as separate components, as illustrated, distributed across one or more devices, or one or more of the components may be integrated into one or more components.

In the example illustrated in FIG. 1, content prediction service 130 accesses union list 110, of common content elements used by both user A and user B, for determining replacement suggestions for content elements within potential communication 132, from user A to user B. In the example, as user A enters the letters "AX", as illustrated at reference numeral 134, content prediction service 130 accesses the word "AXIOM" from union list 110, starting with the letters "AX", and adds "AXIOM" as a suggested replacement content element 136. In one example, a user may enter a space bar or touch "AXIOM", to automatically replace "AX" at reference numeral 134 with "AXIOM". In the example, as illustrated in content prediction database 140, while content prediction database 140 includes multiple words that start with "AX", including "AXIOM" and "AXIAL", with "AXIAL" used more frequently than "AXIOM", content prediction service 130 prioritizes "AXIOM" as the replacement suggestion because "AXIOM" is included in union list 110. In another example, content prediction service 130 may access and suggest multiple replacement suggestions, where the replacement suggestions are ordered to first display replacement suggestions from a selected union list, and then ordered to display other replacement suggestions from content prediction database 140. For example, content prediction service 130 may display suggested replacement content element 136 with a first option of "AXIOM" and a second option of "AXIAL".

In addition, content prediction service 130 may request access to union lists that are filtered according to one or more context identifiers. In one example, content prediction service 130 may detect that the subject matter context of potential communication 132 falls under the subject matter of "project". Content prediction service 130 may request access to a union list for user A and user B, filtered to reflect content associated with the context identifier of "project". If the requested filtered union list is not already loaded into local cache, union list service 126 may identify the union list for user A and user B, from local and remote union list databases and user A content databases, filter the collected union list for user A and user B according to the context identifier, and load the filtered union list into local cache, for access by content prediction service 130. Union list service 126 may also select to push non-active union lists out of local cache, into other storage areas, to minimize the memory overhead required for managing union lists in a user's device. In addition, if content prediction service 130 detects a change in the context identifier that should be used to filter the union list accessed for user A and user B, due to a change in the device used by user A, the subject matter of a communication, or other context change, content prediction service 130 may request access to a union list filtered according to an updated context identifier and union list service 126 may filter the union list for user A and user B according to the updated context identifier and update the filtered union list in local cache with any context identifier based updates.

Figure 2:
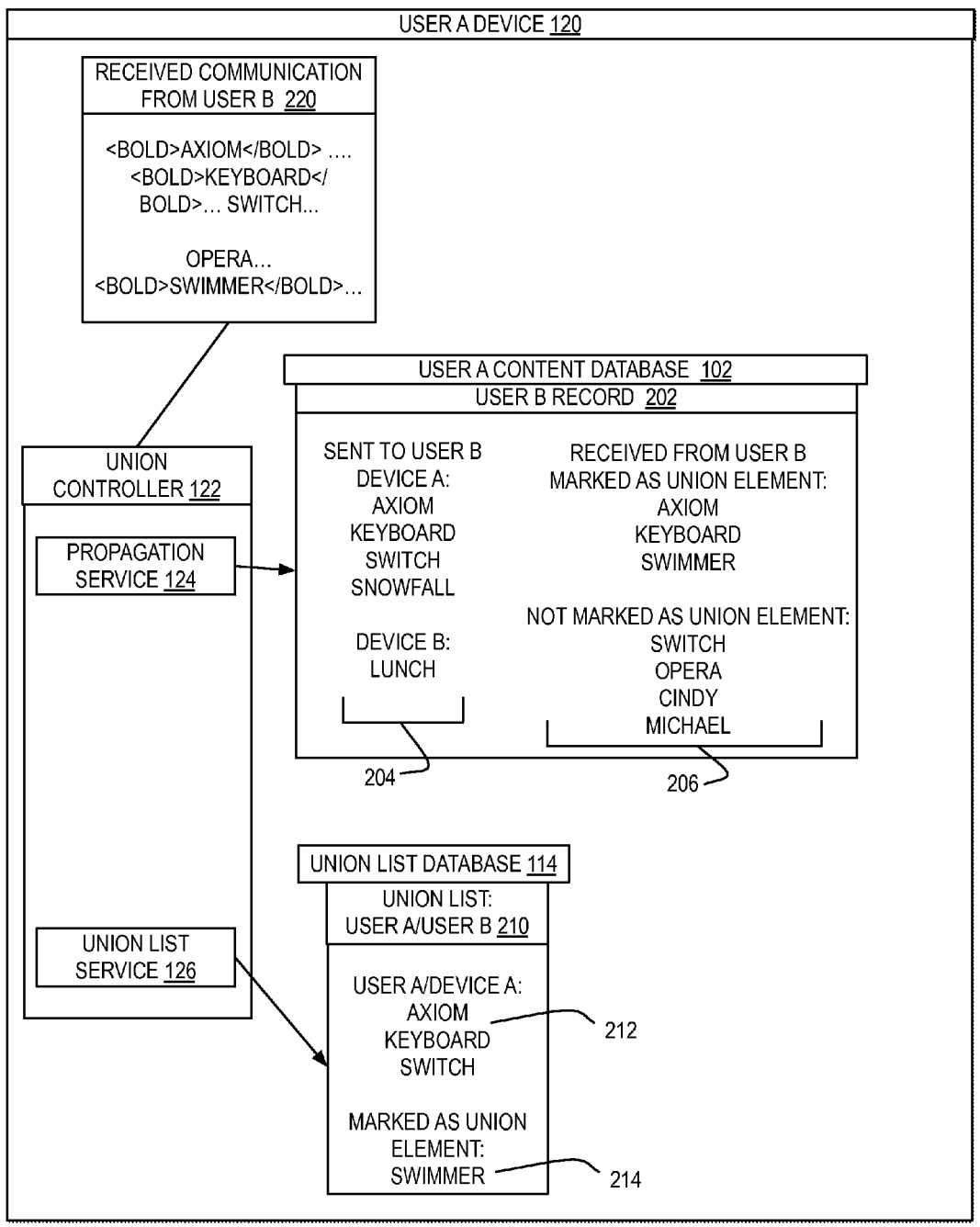
FIG. 2 is a block diagram illustrating one example of a content database for tracking content elements arranged by sender and recipient and a separate union list specifying at least one common content element between a particular user and at least one other user identified from the content database.

With reference now to FIG. 2, a block diagram illustrates one example of a content database for tracking content elements arranged by sender and recipient and a separate union list specifying at least one common content element between a particular user and at least one other user identified from the content database.

In one example, propagation service 124 for a user A parses communications sent by a user A to a user B and parses communications received by user A from user B, and stores parsed content elements from the communications in a user B record 202 within user A content database 102, along with context identifiers. In one example, propagation service 124 detects a device identifier (ID), such as "DEVICE A" and "DEVICE B", of the device from which user A composes each communication including the content elements and stores the device identifiers as context identifiers in user B record 202. In another example, a communication received from user B may include content elements marked in a manner that indicates that the content elements were identified by the union list service for user B as content elements on a union list generated by the union list service for user B. For example, communication 220, received by user A from user B, may include tags for a selection of content elements that marks the content elements as having been on a union list generated by a union list service for user B. For example, in communication 220, the content elements "AXIOM," "KEYBOARD," and "SWIMMER" are marked with <bold></bold> tags, where <bold></bold> tags are used to indicate which content elements were on a union list generated by a union list service for user B, as distinguished from content elements not marked with tags, such as "SWITCH" and "OPERA."

In one example, user B record 202 includes a list 204 of content elements parsed from communications sent by user A to user B, including context elements identifying the devices from which user A composed the communications. For example, list 204 identifies content elements of "AXIOM," "KEYBOARD," "SWITCH," and "SNOWFALL" under a context element of "DEVICE A" and identifies content elements of "LUNCH" under a context element of "DEVICE B".

In one example, user B record 202 also includes a list 206 of content elements parsed from communications received by user A from user B, including context elements for content elements marked within the received communications as "union elements". For example, list 206 identifies content elements of "AXIOM," "KEYBOARD," and "SWIMMER" under a context element of "MARKED AS UNION ELEMENT" and identifies content elements of "SWITCH," "OPERA," "CINDY," and "MICHAEL" under a context element of "NOT MARKED AS UNION ELEMENT".

In one example, in selecting content elements for a union list 210 indicating common content elements used by both user A and user B, union list service 126 may search for common content elements in both list 204 and list 206, such as "AXIOM," "KEYBOARD," and "SWITCH", illustrated in union list 210 at reference numeral 212. In addition, union list service 126 may include context elements from one or more of list 204 and list 206 in union list 210, such as the context element of "USER A/DEVICE A" included in union list 210 based on the context element in list 204 of "DEVICE A".

In addition, in one example, in selecting content elements for union list 210, union list service 216 may include content elements that are included in user B record under a context element of "MARKED AS UNION ELEMENT", but that are not found in both list 204 and list 206. In the example, the content element "SWIMMER" is recorded under the context element of "MARKED AS UNION ELEMENT" in list 206, but the same content element is not also included in list 204. In the example, to maintain consistency between the union elements identified by the union list service for user B and the union elements identified by union list service 126 for user A, union list service 126 includes the content element "SWIMMER" in union list 210 in association with the context element of "MARKED AS UNION ELEMENT".

Figure 3:
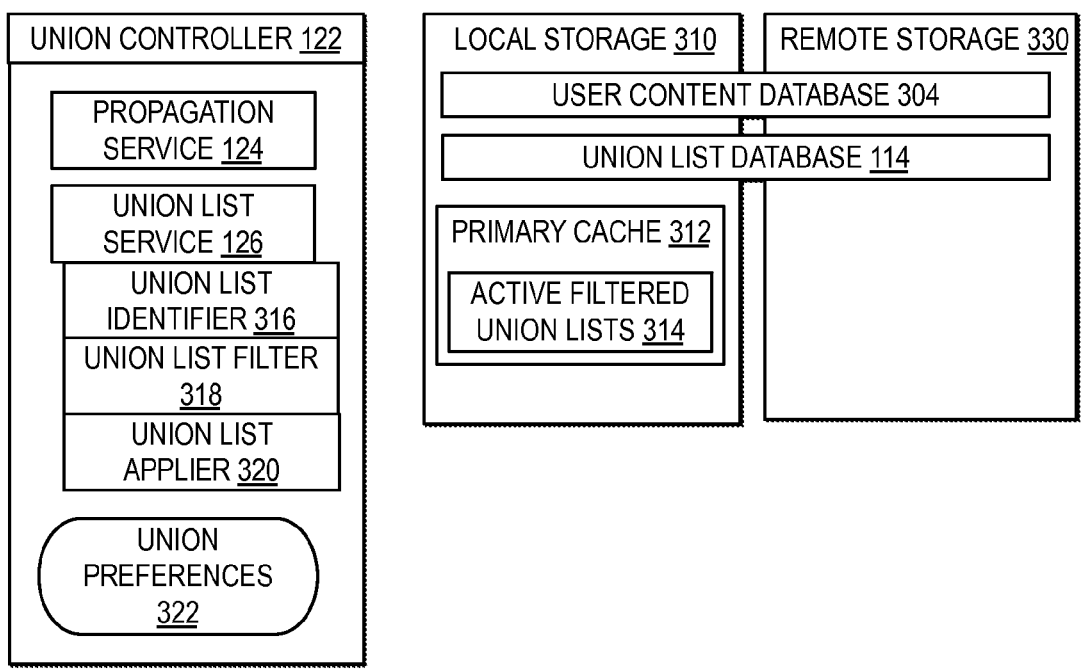
FIG. 3 is a block diagram illustrating one example of components of a union controller for managing union lists of one or more content elements used in communications by each of at least two users.

FIG. 3 illustrates a block diagram of one example of components of a union controller for managing union lists of one or more content elements used in communications by each of at least two users.

In one example, union controller 122 may be located on a user device or the services of union controller 122 may be distributed across one or more systems. In one example, union controller 122 may interface with a local storage 310, within a user device, and may interface with a remote storage 330, such as a storage system of a device accessible via a network. In particular, in one example, where a user device is a mobile device, or other device which may have less local cache and storage space than a non-mobile device, by union controller 122 accessing both local storage 310 and remote storage 330, union controller 122 may control what data is accessed and stored locally and what data is stored remotely, to minimize the operational and storage load of union controller 122 on a user's mobile device. In addition, in another example, by enabling union controller 122 to manage data in both local storage 310 and remote storage 330, the data maintained and analyzed by union controller 122 may be shared among multiple devices used by a user.

In one example, union controller 122 includes a propagation service 124 that parses communications and records content elements in user content database 114 in a manner such that the user who sent a content element is associated with content element, such that union list service 126 may detect common content elements used by multiple users from the entries stored in user content database 304. In one example, user content database 304 may be distributed across local storage 310 and remote storage 330. Propagation service 124 may push user content in user content database 304 from local storage 310 to remote storage 330, when the user content is not needed on local storage 310. Propagation service 124 may collect user content in user content database 304 from remote storage 330 to local storage 310 in order for union list service 126 to analyze the user content and identify one or more union lists. In addition, propagation service 124 may provide an interface through which a user may enter content elements and context elements into user content database 304 in association with one or more user records.

In one example, union list database 114 may also be distributed across local storage 310 and remote storage 330. Union list service 126 may include a union list identifier 316 for analyzing user content database 304 to identify one or more common content elements used by at least two users and generating a union list within union list database 114 containing the common content elements, along with any context elements associated with the common content elements. Union list service 126 may also pull union lists generated by other devices or previously generated, from remote storage 330 to local storage 310, within union list database 114. Union list service 126 may also push union lists generated at a device from local storage 310 to remote storage 330 within union list database 114.

In one example, union list service 126 may include a union list filter 318 that filters one or more union lists in union list database 114, identified for at least two users, according to one or more context identifiers, where the one or more context identifiers may also include a selection not to filter according to context identifiers. Union list filter 318 may store one or more filtered union lists within a primary cache 312 of local storage 310 for access by one or more content prediction services from among active filtered union lists 314 maintained in primary cache 312. In one example, primary cache 312 may represent a storage device within a user device that is a smaller, but higher speed, storage device. In one example, union list filter 318 may determine when a filtered union list is considered no longer active, or non-active, and move the filtered union list out of active filtered union lists 314 and into one or more other storage locations within local storage 310.

In one example, union list service 126 may include a union list applier 320. Union list applier 320 may detect content elements within a proposed communication that match content elements within a union list, or have been replaced by a content prediction service with an element from a union list, and may mark the matching content elements as union list elements, prior to the proposed communication being sent. Union list applier 320 may mark the matching content elements using one or more types of marking functions including, but not limited to, marking matching content elements as union list elements using tags embedded in the content elements, but not visible when the communication is displayed, using graphical treatments of elements that are interpreted as indicators of matching content elements as union list elements, and other markers, and inserting matching content elements into the metadata of a proposed communication. Propagation service 124, upon receiving a communication with matching content elements from union list elements marked within the communication, parses the matching content elements and stores the matching content elements in user content database 304 with a context element indicating that the elements are marked as union elements. Union list service 126, when generating union lists from content elements in user content database 304 with a context element indicating that the content elements are marked as union elements, may automatically add content elements marked as union elements in user content database 304 to a union list, even if the content elements are only listed as used by one of the at least two users for a union list.

In one example, one or more components of union controller 122 may perform functions in accordance with union preferences 322. For example, as to propagation service 124, a user may set preferences in union preferences 322 as to the type of content elements to be parsed and placed in user content database 304, the type of communication to be parsed for content elements, the types of context identifiers to parse and store in user content database 304, the amount and type of content of user content database 304 to maintain in local storage 310, the location of user content database 304 on remote storage 330, and other parameters that specify the content elements gathered and stored in user content database 304 and the storage locations for content elements within user content database 304. For example, as to union list identifier 316, a user may set preferences in union preferences 322 as to the types of content elements to include in union lists, the types and parameters for union lists that are to be automatically created, the type and parameters for union lists that are to be created in response to receiving a request from a content prediction service for access to the union list, the parameters for union lists that are to be stored in local storage 310, the location of union list database 114 on remote storage 330, and other parameters that specify the union lists identified and stored in union list database 114 and the storage locations for union lists within union list database 114.

Figure 4:
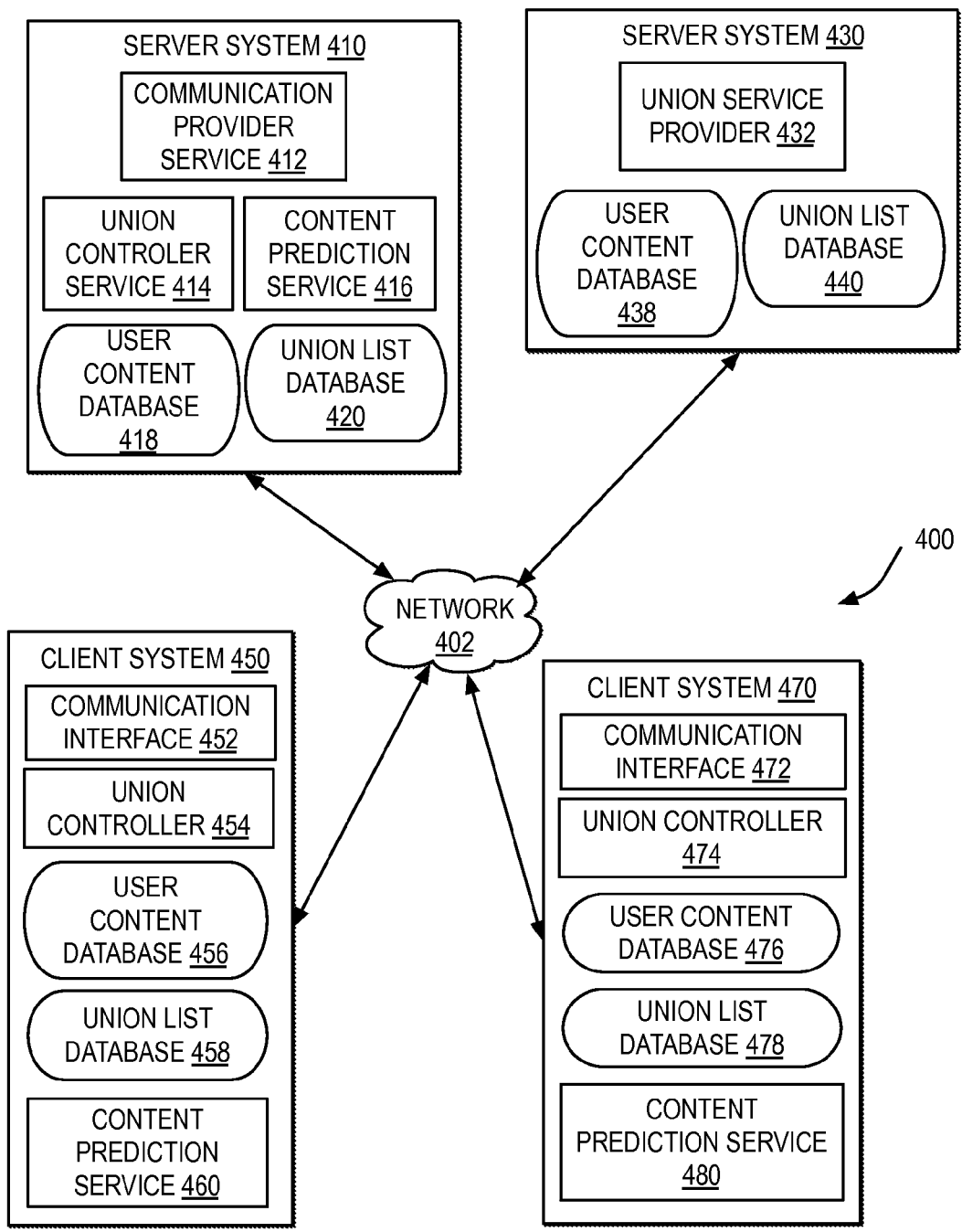
FIG. 4 is a block diagram illustrating one example of a network environment in which a union controller may be implemented.

With reference now to FIG. 4, a block diagram illustrates one example of a network environment in which a union controller may be implemented. One of ordinary skill in the art will appreciate that environment 400 is illustrative of one type of network environment that may support clients, servers and other components of one or more computing systems communicatively connected via a network. In addition, one of ordinary skill in the art will appreciate that the distribution of systems within network environment 400 is illustrative of a distribution of systems, however, other distributions of systems within a network environment may be implemented.

As illustrated, multiple systems within network environment 400 may be communicatively connected via network 402, which is the medium used to provide communications links between various devices and computer systems communicatively connected. Network 402 may include permanent connections such as wire or fiber optics cables and temporary connections made through telephone connections and wireless transmission connections, for example, and may include routers, switches, gateways and other hardware to enable a communication channel between the systems connected via network 402. Network 402 may represent one or more of networks, including cable, satellite, and internet based networks across which data is transmitted, packet-switching based networks, telephony based networks, local area and wire area networks, public networks, and private networks. Network environment 400 may implement multiple types of network architectures.

Network 402 and the systems communicatively connected within network environment 400 via network 402 may implement one or more layers of one or more types of network protocol stacks which may include one or more of a physical layer, a link layer, a network layer, a transport layer, a presentation layer, and an application layer. For example, network 402 may implement one or more of the Transmission Control Protocol/Internet Protocol (TCP/IP) protocol stack or an Open Systems Interconnection (OSI) protocol stack. In addition, for example, network 402 may represent the worldwide collection of networks and gateways that use the TCP/IP suite of protocols to communicate with one another.

In the embodiment, as illustrated, a client system 450 and a client system 470 are communicatively connected via network 402 to one or more of a server system 410 and a server system 430. Each of client system 450, client system 470, server system 410, and server system 430, may represent one or more computer systems, such as computer system 500 of FIG. 5, to be described below.

In one example, client system 450 and client system 470 each provide one or more communications interfaces, such as communication interface 452 and communication interface 472, respectively. Each communication interface may provide a graphical user interface or other input interface through which a user may enter a proposed communication. Communication interface 452 and communication interface 472 may each include, but are not limited to, a text messaging interface, a voice messaging interface, a video messaging interface, an electronic mail interface, a word processing interface, and a graphical program interface. Client system 450 and client system 470 may each also provide a union controller, implementing an instance of one or more of the components of union controller 122, such as union controller 454 and union controller 474, respectively. In addition, client system 450 and client system 470 may each maintain a local instance of user content database 304 and union list database 114, illustrated in client system 450 as a local user content database 456 and a local union list database 458 and illustrated in client system 470 as a local user content database 476 and a local union list database 478.

In one example, union controller 454 may access content from and store data in user content database 456, however, union controller 454 may also request union controller services, user content, and union list content from one or more remote systems, such as from server system 410 or server system 430. In addition, union controller 474 may access content from and store data in user content database 476, however, union controller 474 may also request union controller services, user content, and union list content from one or more remote systems, such as from server system 410 or server system 430.

In one example, client system 450 may provide a content prediction service 460, that detects content for a proposed communication entered in communication interface 452, accesses a union list from union list database 458 specified for the sender of the communication and at least one recipient of the communication, filtered by union controller 454 according to one or more context identifiers, and suggests replacement content to the user at client system 450 for one or more content elements within communication interface 452 based on the common content elements in the union list. In one example, client system 450 may send communications drafted in communication interface 452 through at least one service provider to a recipient at client system 470. For example, server system 410 may provide a communication provider service 412 for managing the transmission and distribution of communications from one client system to another client system via network 402, including transmitting communications to one or more additional communication provider services subscribed to by client system 470. In another example, client system 450 may send communications drafted in communication interface 452 through a peer-to-peer network via network 402 to client system 470.

In one example, client system 470 may provide union controller 474 for detecting content in a communication received by client system 470, parses the received content according to sender and recipient and identifies one or more context elements, stores the parsed content elements according to context elements in union content database 476, and updates union list database 478 according to the newly parsed content elements and context elements. In addition, client system 470 may provide a content prediction service 480 that detects content for a proposed communication entered in communication interface 472, in response to the received communication, accesses the union list from union list database 478 specified for the sender of the communication and at least one recipient of the communication, filtered by union controller 474 according to one or more context identifiers, and suggests replacement content to the user at client system 470 for one or more content elements within communication interface 472 based on the common content elements in the union list. In one example, client system 470 may send communications drafted in communication interface 472 through at least one service provider to a recipient at client system 450, or another system or client system 470 may send communications drafted in communication interface 472 through a peer-to-peer network via network 402 to client system 450 or another system.

In one example, client system 450 and client system 470 are logged onto and used by different users. In one example, a user may represent another individual user. In another example, a user may represent a business service, a website, or a network location. In another example, client system 450 and client system 470 may be logged onto and used by the same user, such as, for example, where client system 450 and client system 470 represent different devices used by a same user.

In one example, server system 410 may implement communication provider service 412, for providing communication service to one or more users subscribing to the communication delivery service provided by communication provider service 412. In addition, server system 410 may provide one or more additional services to one or more subscribing users logged into one or more devices, such as client system 450 and client system 470. For example, server system 410, in addition to providing communication service to one or more client devices, may also provide union controller service 414, implementing one or more instances of union controller 122, to subscribers at client devices. In addition, for example, server system 410, in addition to providing communication service to one or more client devices, may also provide content prediction service 416, for implementing one or more instances of content prediction service 130, to subscribers at client devices. In addition, for example, server system 410, in addition to providing communication service to one or more client devices, may provide data storage services, such as through providing a remote instance of user content database 304, illustrated as user content database 418, and a remote instance of union list database 114, illustrated as union list database 420. In one example, union controller 454 and union controller 474 may represent programming interfaces for accessing union controller service 414 through communication provider service 412. In one example, content prediction service 460 and content prediction service 480 may represent programming interfaces for accessing content prediction service 416 through communication provider service 412.

In one example, server system 430 may implement union service provider 432, for providing one or more of the components of union controller 122 and one or more of the storage units of user content database 304 and union list database 114, as a service, to one or more client devices. In one example, union service provider 432 represents a service for providing an instance of one or more components of union controller 122 to one or more of client system 450 and client system 470. In addition, for example, server system 430 may provide data storage services for union services, such as through providing a remote instance of user content database 304, illustrated as user content database 438, and a remote instance of union list database 114, illustrated as union list database 440.

In one example, client system 450 and client system 470, executing the components of each client system, respectively, may represent stand-alone devices. In another example, client system 450 and client system 470 may represent general computer systems executing one or more components of each client system, through a browser or other interface, running communication interface 450, union controller 454, content prediction service 460, communication interface 472, union controller 474, and content predictions service 480 as functions of the browser or other interface, as plug-ins, as stand-alone functions, or as other executable components of the computer system. In one example, each of server system 410 and server system 430 may represent a networked environment of multiple server systems and may implement one or more layers to implement a cloud environment.

Figure 5:
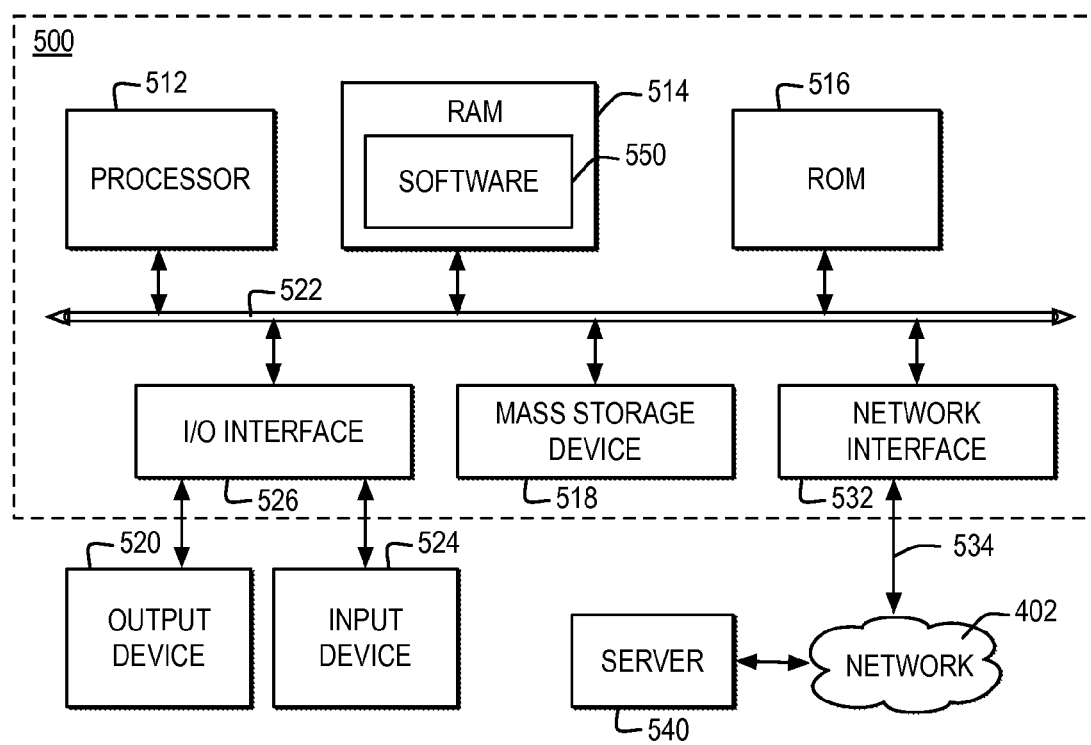
FIG. 5 is a block diagram illustrating one example of a computer system in which one embodiment of the invention may be implemented.

FIG. 5 illustrates a block diagram of one example of a computer system in which one embodiment of the invention may be implemented. The present invention may be performed in a variety of systems and combinations of systems, made up of functional components, such as the functional components described with reference to a computer system 500 and may be communicatively connected to a network, such as network 402.

Computer system 500 includes a bus 522 or other communication device for communicating information within computer system 500, and at least one hardware processing device, such as processor 512, coupled to bus 522 for processing information. Bus 522 preferably includes low-latency and higher latency paths that are connected by bridges and adapters and controlled within computer system 500 by multiple bus controllers. When implemented as a server or node, computer system 500 may include multiple processors designed to improve network servicing power. Where multiple processors share bus 522, additional controllers (not depicted) for managing bus access and locks may be implemented.

Processor 512 may be at least one general-purpose processor such as IBM® PowerPC® processor that, during normal operation, processes data under the control of software 550, which may include at least one of application software, an operating system, middleware, and other code and computer executable programs accessible from a dynamic storage device such as random access memory (RAM) 514, a static storage device such as Read Only Memory (ROM) 516, a data storage device, such as mass storage device 518, or other data storage medium. Software 550 may include, but is not limited to, code, applications, protocols, interfaces, and processes for controlling one or more systems within a network including, but not limited to, an adapter, a switch, a server, a cluster system, and a grid environment.

In one embodiment, the operations performed by processor 512 may control the operations of flowchart of FIGS. 6-11 and other operations described herein. Operations performed by processor 512 may be requested by software 550 or other code or the steps of one embodiment of the invention might be performed by specific hardware components that contain hardwired logic for performing the steps, or by any combination of programmed computer components and custom hardware components. In one embodiment, one or more components of computer system 500, or other components, which may be integrated into one or more components of computer system 500, may contain hardwired logic for performing the operations of flowcharts FIGS. 6-11.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 518, a random access memory (RAM), such as RAM 514, a read-only memory (ROM) 516, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 500, partly on the user's computer, as a stand-alone software package, partly on the user's computer and partly on a remote computer or entirely on the remote computer or server, such as server 540. In the latter scenario, the remote computer may be connected to the user's computer through any type of network, such as network 402, through a communication interface, such as network interface 532, over a network link that may be connected, for example, to network 402.

In the example, network interface 532 includes an adapter 534 for connecting computer system 500 to network 402 through a link and for communicatively connecting computer system 500 to server 540 or other computing systems via network 402. Although not depicted, network interface 532 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 500, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 500, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 532, the network link to network 402, and network 402 may use electrical, electromagnetic, or optical signals that carry digital data streams. The signals through the various networks and the signals on network 402, the network link to network 402, and network interface 532 which carry the digital data to and from computer system 500, may be forms of carrier waves transporting the information.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, an image scanning system, a keyboard, a mouse, or other input peripheral device, communicatively enabled on bus 522 via I/O interface 526 controlling inputs. In addition, for example, output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
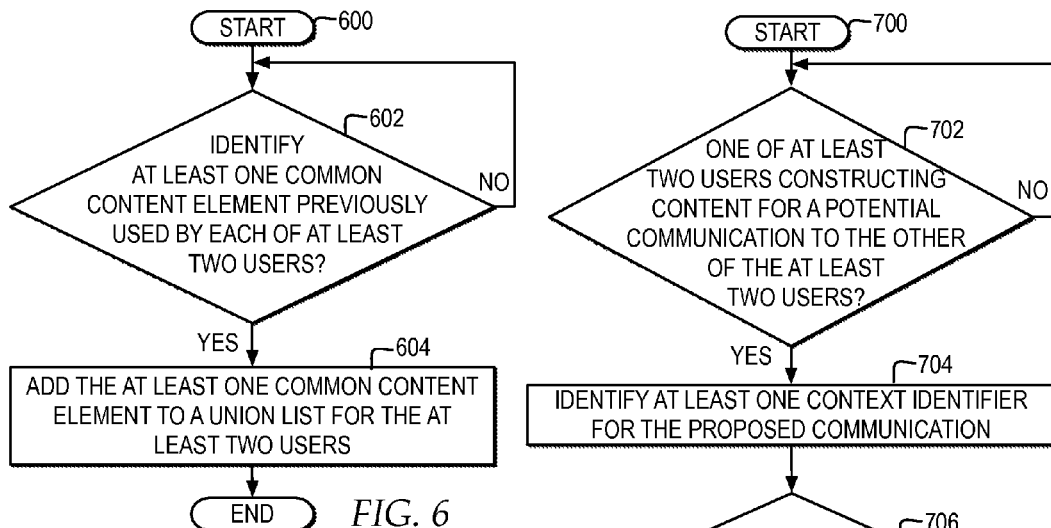
FIG. 6 is a high level logic flowchart depicting one example of a high level logic flowchart of a process and program for generating a union list of at least one common content element used by at least two users.

FIG. 6 illustrates one example of a high level logic flowchart of a process and program for generating a union list of at least one common content element used by at least two users.

In the example, the process and program starts at block 600 and thereafter proceeds to block 602. Block 602 illustrates a determination whether at least one common content element previous used by each of at least two users is identified. If at least one common content element used by each of at least two users is identified, then the process passes to block 604. Block 604 illustrates adding the at least one common content element to an union list for the at least two users, and the process ends.

Figure 7:
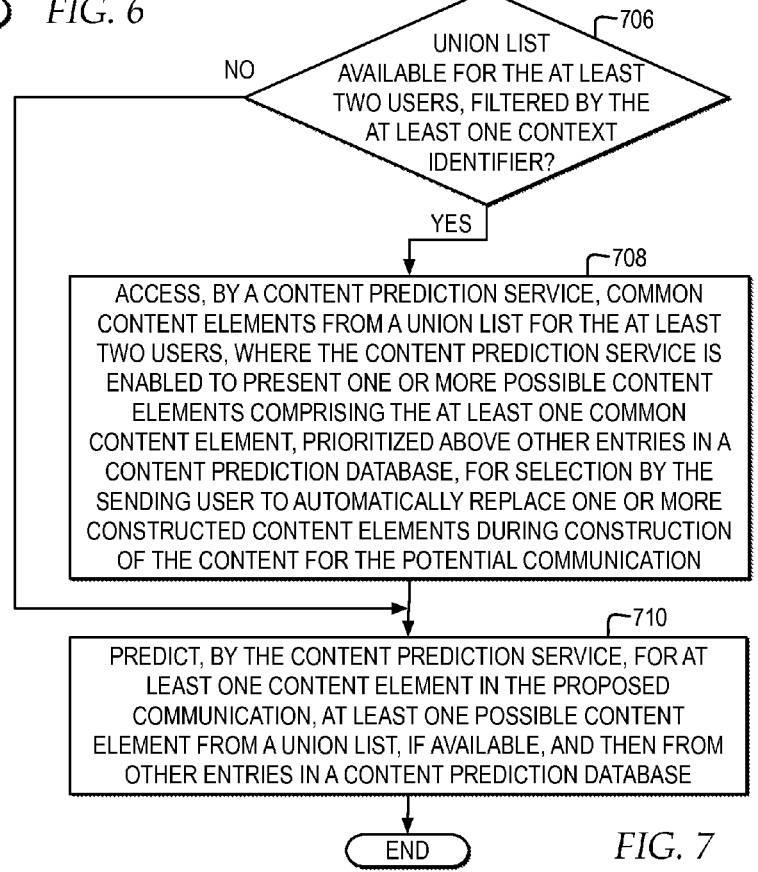
FIG. 7 is a high level logic flowchart depicting one example of a high level logic flowchart of a process and program for accessing a union list of at least one common content element used by at least two users for use by a content prediction service.

FIG. 7 illustrates one example of a high level logic flowchart of a process and program for accessing a union list of at least one common content element used by at least two users for use by a content prediction service. In the example, the process starts at block 700 and thereafter proceeds to block 702. Block 702 illustrates a determination whether one of at least two users constructing content for a potential communication to the other of the at least two users is detected. At block 702, if one of at least two users constructing content for a potential communication to the other of the at least two users is detected, then the process passes to block 704. Block 704 illustrates identifying at least one context identifier for the proposed communication. Next, block 706 illustrates a determination whether a union list is available for the at least two users, filtered by at least one context identifier. At block 706, if there is not a union list available for the at least two users, filtered by the at least one context identifier, then the process passes to block 710.

At block 706, if there is a union list available for the at least two users, filtered by the at least one context identifier, then the process passes to block 708. Block 708 illustrates accessing, by a content prediction service, common content elements from a union list for the at least two users, where the content prediction service is enabled to present one or more possible content elements comprising the at least one common content element, prioritized above other entries in a content prediction database, for selection by the composing user to automatically replace one or more constructed content elements during construction of the content for the potential communication, and the process passes to block 710. Block 710 illustrates predicting, by the content prediction service, for at least one content element in the proposed communication, at least one possible content element from a union list, if available, and then from other entries in a content prediction database, and the process ends.

Figure 8:
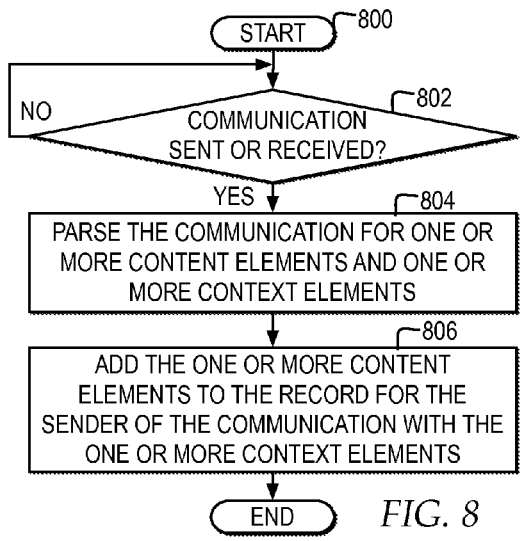
FIG. 8 is a high level logic flowchart depicting one example of a high level logic flowchart of a process and program for parsing a communication to add content elements and context elements to a content database for use by a union list service in determining at least one common content element used by at least two users.

FIG. 8 illustrates one example of a high level logic flowchart of a process and program for parsing a communication to add content elements and context elements to a content database for use by a union list service in determining at least one common content element used by at least two users.

In the example, the process starts at block 800 and thereafter proceeds to block 802. Block 802 illustrates a determination whether a communication is sent by a user or received by a user from another sender. At block 802, if a communication is sent by a user or received by the user from another sender, then the process passes to block 804. Block 804 illustrates parsing the communication for one or more content elements and one or more context elements. Next, block 806 illustrates adding the one or more content elements to the content record for the sender of the communication with the one or more context elements, and the process ends.

Figure 9:
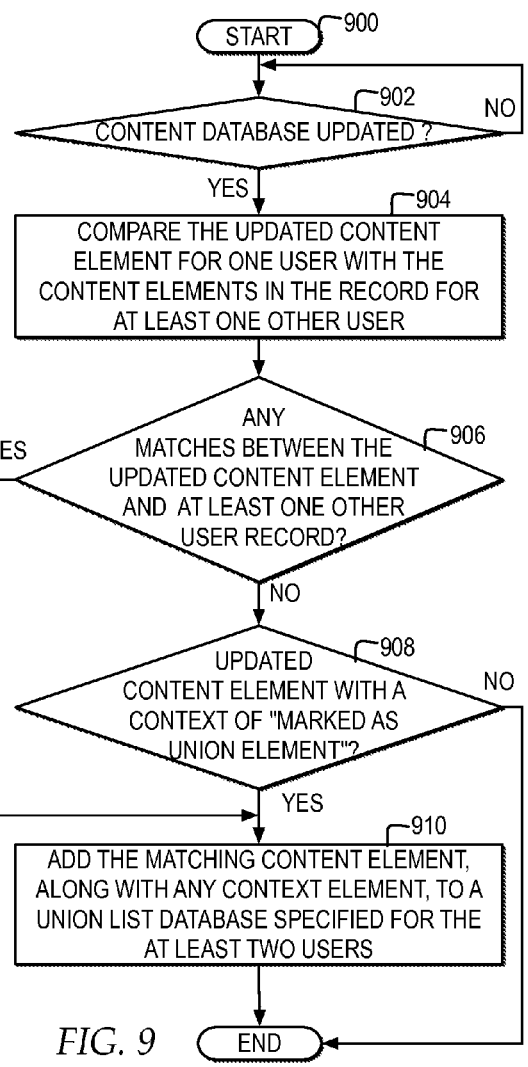
FIG. 9 is a high level logic flowchart depicting one example of a high level logic flowchart of a process and program for updating union lists to reflect updates to a content database.

FIG. 9 illustrates one example of a high level logic flowchart of a process and program for updating union lists to reflect updates to a content database.

In the example, the process starts at block 900 and thereafter proceeds to block 902. Block 902 illustrates a determination whether a content database is updated. At block 902, if a content database is updated, then the process passes to block 904. Block 904 illustrates comparing the updated content element for one user with the content elements in the record for at least one other user. Next, block 906 illustrates a determination whether there are any matches between the updated content element and at least one other user record. At block 906, if there are any matches between the updated content element and at least one other user record, then the process passes to block 910. Block 910 illustrates adding the matching content element, along with any context element, to a union list database specified for the at least two users, and the process ends.

Returning to block 906, at block 906 if there are not any matches between the updated content element and at least one other user record, then the process passes to block 908. Block 908 illustrates a determination whether there are any updated content elements with a context of "marked as union element". At block 908, if there are not any updated content elements with a context of "marked as union element", then the process ends. At block 908, if there are updated content elements with a context of "marked as union element", then the process passes to block 910.

FIG. 10 illustrates one example of a high level logic flowchart of a process and program for marking union words in a proposed communication.

In the example, the process starts at block 1000 and thereafter proceeds to block 1002. Block 1002 illustrates a determination whether any content elements are replaced with union words by the content prediction service during composition of a potential communication. At block 1002, if any content elements are replaced with union words by the content prediction service during composition of a potential communication, then the process passes to block 1004. Block 1004 illustrates marking the replaced union words in the potential communication with a selected indicator that is embedded within the potential communication to indicate that each word is a union word, and the process ends.

FIG. 11 illustrates one example of a high level logic flowchart of a process and program for moving context identifier filtered union lists into local cache for use by a content prediction service.

In the example, the process starts at block 1100 and thereafter proceeds to block 1102. Block 1102 illustrates a determination whether a determination for union list availability, according to at least one context identifier, is detected. At block 1102, if a determination whether a determination for union list availability, according to at least one context identifier, is detected, then the process passes to block 1104. Block 1104 illustrates a determination whether a union list, filtered for the at least one context identifier, is already loaded into local cache. At block 1104, if a union list, filtered for the at least one context identifier, is already loaded into local cache, then the process ends. At block 1104, if a union list, filtered for the at least one context identifier, is not already located into local cache, then the process passes to block 1106. Block 1106 illustrates requesting one or more union lists for the at least two users, filtered by the at least one context identifier, from local and remote union list services. Next, block 1108 illustrates a determination whether at least one union list is received from at least one of a local and remote union list service. At block 1108, if no union list is received, then the process passes to block 1114. Block 1114 illustrates returning an indicator that no union list is identified, and the process ends. Returning to block 1108, if at least one union list is received, then the process passes to block 1110. Block 1110 illustrates loading the context identifier filtered union list into local cache for access by a content prediction service. In one example, loading the context identified filtered union list into local cache for access by the content prediction service may also include loading the filtered union list into a content prediction database loaded into local cache for use by the content prediction service in predicting possible content elements. Next, block 1112 illustrates moving non-active union lists from local cache to other storage locations, and the process ends. A determination of whether a union list in local cache is non-active may be made based one or more criteria including, but not limited to, the amount of time that has passed since the last access to the union list and whether there are any active conversations open between the users assigned to the union list.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for managing content available for content prediction, comprising:
    storing, by a computer, one or more first content elements parsed from one or more first communications sent by a first user to one or more other users;
    storing, by a computer, one or more second content elements parsed from one or more second communications received by the first user from a second user of the one or more other users;
    identifying, by the computer, a union list comprising at least one common content element stored in both the one or more first content elements and the one or more second content elements by:
        storing, by the computer, one or more first context elements identified from the one or more first communications with the one or more first content elements; and
        storing, by the computer, one or more second context elements identified from the one or more second communications with the one or more second content elements;
    responsive to the first user constructing content for a potential communication to at least the second user, accessing, by the computer, the union list comprising the at least one common content element for use by at least one content prediction service enabled to present one or more possible content elements comprising the at least one common content element for user selection during construction of the content for the potential communication;
    filtering, by the computer, the one or more first context elements and the one or more second context elements in the at least one union list, according to at least one context identifier identified for the potential communication; and
    responsive to the at least one context identifier identified for the potential communication changing to a second context identifier, filtering, by the computer, the one or more first context elements and the one or more second context elements in the at least one union list according to the second context identifier.

2. The method according to claim 1, further comprising:
    identifying, by the computer, the one or more first context elements from the one or more first communications comprising at least one of an identifier of a device through which the one or more first communications is drafted, a project associated with the one or more first communications, and a marking embedded in the one or more first communications indicating at least one content element comprising the at least one common content element.

3. The method according to claim 1, further comprising:
    responsive to replacing one or more elements within the content for the potential communication with the at least one common content element, marking, by the computer, each element within the potential communication matching the at least one common content element with a common content element indicator tag embedded within the potential communication, such that the second user receiving the potential communication receives the potential communication with content determined for the first user as the at least one common content element marked with the common content element indicator.

4. The method according to claim 3, further comprising:
    responsive to the second user receiving the first potential communication, identifying, by the computer, the at least one common content element identified by the common content element indicator tag; and
    responsive to the second user constructing content for a second potential communication to at least the first user, accessing, by the computer, the at least one common content element identified by the common content element indicator tag from the first potential communication for use by at least one content prediction service enabled to present one or more possible content elements comprising the at least one common content element for user selection by the second user during construction of the content for the second potential communication.

5. The method according to claim 1, wherein responsive to the first user constructing content for a potential communication to at least the second user, accessing, by the computer, the union list comprising the at least one common content element for use by at least one content prediction service enabled to present one or more possible content elements comprising the at least one common content element for user selection during construction of the content for the potential communication further comprises:
    loading, by the computer, the union list comprising the at least one common content element into a cache; and
    pushing, by the computer, at least one previously cached common content element from the cache to another storage location.

6. The method according to claim 1, wherein responsive to the first user constructing content for a potential communication to at least the second user, accessing, by the computer, the union list comprising the at least one common content element for use by at least one content prediction service enabled to present one or more possible content elements comprising the at least one common content element for user selection during construction of the content for the potential communication further comprises:
   adding the union list comprising the at least one common content element into a content prediction database accessed by the at least content prediction service when identifying one or more replacement content elements to present for user selection as the one or more possible content elements.

7. A system for managing content available for content prediction, comprising:
   a computer, comprising at least one processor, configured to store one or more first content elements parsed from one or more first communications sent by a first user to one or more other users;
   the computer configured to store one or more second content elements parsed from one or more second communications received by the first user from a second user of the one or more other users;
   the computer, configured to identify a union list comprising at least one common content element stored in both the one or more first content elements and the one or more second content elements by:
      storing, by the computer, one or more first context elements identified from the one or more first communications with the one or more first content elements; and
      storing, by the computer, one or more second context elements identified from the one or more second communications with the one or more second content elements;
   the computer, responsive to the first user constructing content for a potential communication to at least the second user, configured to access the union list comprising the at least one common content element for use by at least one content prediction service enabled to present one or more possible content elements comprising the at least one common content element for user selection during construction of the content for the potential communication;
   the computer configured to filter the one or more first context elements and the one or more second context elements in the at least one union list, according to at least one context identifier identified for the potential communication;
   the computer, responsive to the at least one context identifier identified for the potential communication changing to a second context identifier, configured to filter the one or more first context elements and the one or more second context elements in the at least one union list according to the second context identifier.

8. The system according to claim 7, wherein the computer, comprising at least one processor, configured to identify one or more context elements from the at least one communication further comprises:
   the computer configured to identify the one or more first context elements from the one or more first communications comprising at least one of an identifier of a device through which the one or more first communications is drafted, a project associated with the one or more first communications, and a marking embedded in the one or more first communications indicating at least one content element comprising the at least one common content element.

9. The system according to claim 7, further comprising:
   the computer, responsive to replacing one or more elements within the content for the potential communication with the at least one common content element, configured to mark each element within the potential communication matching the at least one common content element with a common content element indicator tag embedded within the potential communication, such that the second user receiving the potential communication receives the potential communication with content determined for the first user as the at least one common content element marked with the common content element indicator.

10. The system according to claim 7, wherein the computer, responsive to one of the at least two users constructing content for a potential communication to the other of the at least two users, configured to access the at least one common content element for use by at least one content prediction service enabled to present one or more possible content elements comprising the at least one common content element for user selection during construction of the content for the potential communication further comprises:
   the computer configured to load the union list comprising the at least one common content element into a cache; and
   the computer configured to push at least one previously cached common content element from the cache to another storage location.

11. The system according to claim 7, wherein the computer, responsive to the first user constructing content for a potential communication to at least the second user, configured to access the union list comprising the at least one common content element for use by at least one content prediction service enabled to present one or more possible content elements comprising the at least one common content element for user selection during construction of the content for the potential communication, further comprises:
   the computer configured to add the union list comprising the at least one common content element into a content prediction database accessed by the at least content prediction service when identifying one or more replacement content elements to present for user selection as the one or more possible content elements.

12. A computer program product for managing program recordings, the computer program product comprising:
   one or more computer-readable tangible storage devices;
   program instructions, stored on at least one of the one or more storage devices, to store one or more first content elements parsed from one or more first communications sent by a first user to one or more other users;
   program instructions, stored on at least one of the one or more storage devices, to store one or more second content elements parsed from one or more second communications received by the first user from a second user of the one or more other users;
   program instructions, stored on at least one of the one or more storage devices, to identify a union list comprising at least one common content element stored in both the one or more first content elements and the one or more second content elements by:
      storing one or more first context elements identified from the one or more first communications with the one or more first content elements; and storing one or more second context elements identified from the one or more second communications with the one or more second content elements;

program instructions, stored on at least one of the one or more storage devices, responsive to the first user constructing content for a potential communication to at least the second user, to access the union list comprising the at least one common content element for use by at least one content prediction service enabled to present one or more possible content elements comprising the at least one common content element for user selection during construction of the content for the potential communication;

program instructions, stored on at least one of the one or more storage devices, to filter the one or more first context elements and the one or more second context elements in the at least one union list, according to at least one context identifier identified for the potential communication;

program instructions, stored on at least one of the one or more storage devices, responsive to the at least one context identifier identified for the potential communication changing to a second context identifier, to filter the one or more first context elements and the one or more second context elements in the at least one union list according to the second context identifier.

13. The computer program product according to claim 12, further comprising:

program instructions, stored on at least one of the one or more storage devices, responsive to replacing one or more elements within the content for the potential communication with the at least one common content element, to mark each element within the potential communication matching the at least one common content element with a common content element indicator tag embedded within the potential communication, such that the second user receiving the potential communication receives the potential communication with content determined for the first user as the at least one common content element marked with the common content element indicator.

* * * * *